(12) United States Patent
DeCia et al.

(10) Patent No.: US 10,363,796 B2
(45) Date of Patent: Jul. 30, 2019

(54) CONTROL MODULE ACTIVATION OF VEHICLES IN A KEY-OFF STATE

(71) Applicant: Ford Global Technologies, LLC, Dearborn, MI (US)

(72) Inventors: Nunzio DeCia, Northville, MI (US); David A. Herman, Southfield, MI (US); Arun Dutta, Ann Arbor, MI (US); Bill Dierker, Canton, MI (US); Justin Cartwright, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 15/491,872

(22) Filed: Apr. 19, 2017

(65) Prior Publication Data

US 2018/0304836 A1    Oct. 25, 2018

(51) Int. Cl.
| | |
|---|---|
| *B60R 16/037* | (2006.01) |
| *H04B 1/3822* | (2015.01) |
| *B60R 16/033* | (2006.01) |
| *B60H 1/00* | (2006.01) |
| *B60R 16/03* | (2006.01) |

(52) U.S. Cl.
CPC ..... *B60H 1/00778* (2013.01); *B60H 1/00657* (2013.01); *B60R 16/03* (2013.01); *H04B 1/3822* (2013.01)

(58) Field of Classification Search
CPC . B60R 16/037; B60R 16/033; B60H 1/00778; H04B 1/3822
USPC .......................................................... 701/2
See application file for complete search history.

(56) References Cited

U.S. PATENT DOCUMENTS

| | | | | |
|---|---|---|---|---|
| 4,986,384 A | * | 1/1991 | Okamoto | ............. G05D 1/0022 |
| | | | | 180/167 |
| 5,646,843 A | * | 7/1997 | Gudat | ................ B60K 31/0008 |
| | | | | 348/114 |
| 5,781,013 A | | 7/1998 | Takahashi | |

(Continued)

FOREIGN PATENT DOCUMENTS

| | | |
|---|---|---|
| JP | 2008260384 A | 10/2008 |
| JP | 2013074706 A | 4/2013 |

(Continued)

OTHER PUBLICATIONS

Liebetrau et al., "Energy Saving in Automotive E/E Architectures", Infineon Technologies, Dec. 2012, pp. 1-21. (Year: 2012).

(Continued)

*Primary Examiner* — Tuan C To
(74) *Attorney, Agent, or Firm* — Frank Lollo; Neal, Gerber & Eisenberg LLP; James P. Muraff

(57) ABSTRACT

Method and apparatus are disclosed for control module activation of vehicles in a key-off state. An example system includes a vehicle at a location in a key-off state that includes a battery, a communication module, and an infotainment unit to activate and present media responsive to the communication module receiving an activation signal. The example system also includes a remote processor to determine a charge level of the battery, identify a parking duration for the location, and send the activation signal responsive to the charge level being less than a threshold associated with the parking duration.

20 Claims, 6 Drawing Sheets

(56) References Cited

U.S. PATENT DOCUMENTS

| | | | |
|---|---|---|---|
| 6,570,609 B1 | 5/2003 | Heien | |
| 7,471,192 B2 | 12/2008 | Hara et al. | |
| 8,000,858 B2 * | 8/2011 | Tonegawa | B60L 53/665 |
| | | | 701/36 |
| 8,731,773 B2 * | 5/2014 | Yousefi | H04N 7/183 |
| | | | 701/36 |
| 8,989,954 B1 | 3/2015 | Addepalli et al. | |
| 9,349,223 B1 * | 5/2016 | Palmer | G07C 5/008 |
| 9,377,315 B2 | 6/2016 | Grover | |
| 9,429,943 B2 | 8/2016 | Wilson | |
| 9,452,732 B1 | 9/2016 | Hermann et al. | |
| 9,513,133 B2 * | 12/2016 | Semsey | G07B 15/02 |
| 9,547,309 B2 | 1/2017 | Ross | |
| 9,625,906 B2 | 4/2017 | Meuleau | |
| 9,646,356 B1 | 5/2017 | Schwie | |
| 9,649,999 B1 * | 5/2017 | Amireddy | B60R 16/023 |
| 9,697,503 B1 * | 7/2017 | Penilla | G06Q 10/20 |
| 9,834,114 B2 * | 12/2017 | Hettrich | H04W 4/029 |
| 9,836,057 B2 | 12/2017 | Fairfield | |
| 9,870,649 B1 * | 1/2018 | Fields | G08G 1/096791 |
| 9,911,084 B2 | 3/2018 | Bryson | |
| 10,025,899 B2 | 7/2018 | Tarte | |
| 2004/0024502 A1 * | 2/2004 | Squires | A62C 27/00 |
| | | | 701/29.3 |
| 2005/0285445 A1 * | 12/2005 | Wruck | H02J 1/14 |
| | | | 307/10.1 |
| 2006/0092043 A1 | 5/2006 | Lagassey | |
| 2008/0079554 A1 | 4/2008 | Boice | |
| 2008/0252485 A1 | 10/2008 | Lagassey | |
| 2010/0198498 A1 * | 8/2010 | Jansen | G01C 21/26 |
| | | | 701/533 |
| 2010/0305779 A1 * | 12/2010 | Hassan | G01C 17/38 |
| | | | 701/2 |
| 2012/0286974 A1 | 11/2012 | Claussen et al. | |
| 2013/0079978 A1 | 3/2013 | Uyeki | |
| 2014/0266004 A1 * | 9/2014 | Andrews, Jr. | B60L 11/005 |
| | | | 320/104 |
| 2014/0300494 A1 | 10/2014 | Tseng et al. | |
| 2015/0221142 A1 | 8/2015 | Kim et al. | |
| 2015/0371456 A1 | 12/2015 | Moore, Jr. | |
| 2016/0031339 A1 | 2/2016 | Geo | |
| 2016/0082975 A1 | 3/2016 | Lovett et al. | |
| 2016/0207375 A1 | 7/2016 | Gauthier et al. | |
| 2016/0244010 A1 | 8/2016 | Tseng et al. | |
| 2016/0300170 A1 * | 10/2016 | Sun | G06Q 10/06315 |
| 2016/0352113 A1 * | 12/2016 | Zhao | H02J 7/0027 |
| 2017/0036557 A1 * | 2/2017 | Tsuchiya | B60L 11/1838 |
| 2017/0253201 A1 * | 9/2017 | Maeshiro | B60R 16/037 |
| 2017/0345084 A1 | 11/2017 | Gordon | |
| 2018/0141508 A1 * | 5/2018 | Lee | B60R 16/0232 |

FOREIGN PATENT DOCUMENTS

| | | | | |
|---|---|---|---|---|
| JP | 2013086529 A | | 5/2013 | |
| JP | 2014011849 A | | 1/2014 | |
| JP | 5553584 B2 * | | 7/2014 | |
| KR | 101519258 B1 * | | 5/2015 | F02D 41/042 |
| WO | WO 2016016768 A1 | | 2/1916 | |
| WO | WO 0118491 A1 | | 3/2001 | |
| WO | WO 2004071824 A1 | | 8/2004 | |
| WO | WO 2007066064 A1 | | 6/2007 | |
| WO | WO-2011099116 A1 * | | 8/2011 | B60L 11/005 |
| WO | WO-2014037540 A1 * | | 3/2014 | B60W 50/082 |

OTHER PUBLICATIONS

Hong et al., "State-Based Power Optimization Using Mixed-Criticality Filter for Automotive Networks", IEEE Intelligent Vehicles Symposium, Jun. 2015, pp. 773-778. (Year: 2015).

Search Report dated Oct. 17, 2018 for GB Patent Application No. GB 1806280.2 (4 pages).

Search Report dated Oct. 19, 2018 for GB Patent Application No. GB 1806300.8 (3 pages).

Search Report dated Oct. 30, 2018 for GB Patent Application No. GB 1806176.2 (3 pages).

* cited by examiner

US 10,363,796 B2

CONTROL MODULE ACTIVATION OF VEHICLES IN A KEY-OFF STATE

CROSS-REFERENCE TO RELATED APPLICATIONS

This application relates to U.S. patent application Ser. No. 15/491,896 and U.S. patent application Ser. No. 15/491,878 filed on Apr. 19, 2017, both of which are incorporated by reference in their entirety.

TECHNICAL FIELD

The present disclosure generally relates to control modules and, more specifically, to control module activation of vehicles in a key-off state.

BACKGROUND

Vehicles typically include a plurality of electronic control units. Generally, each of the electronic control units monitor and control various subsystems throughout the vehicle. For instance, some vehicles include electronic control units to monitor and control an engine, a battery, door functions, human-machine interfaces, suspension, cruise-control, telematics, brakes, seats, etc. The electronic control units may include hardware, firmware, circuits, input devices, and/or output devices to monitor and control the corresponding subsystem.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for control module activation of vehicles in a key-off state. An example disclosed system includes a vehicle at a location in a key-off state that includes a battery, a communication module, and an infotainment unit to activate and present media responsive to the communication module receiving an activation signal. The example disclosed system also includes a remote processor to determine a charge level of the battery, identify a parking duration for the location, and send the activation signal responsive to the charge level being greater than a threshold associated with the parking duration.

An example disclosed method for activating vehicle control modules includes determining, via a battery sensor, a charge level of a battery of a vehicle at location in a key-off state and identifying, via a processor, a parking duration for the location. The example disclosed method also includes activating an infotainment unit responsive to the charge level being greater than a threshold associated with the parking duration and presenting media via the infotainment unit.

An example disclosed tangible computer readable medium includes instructions which, when executed, cause a machine to determine, via a battery sensor, a charge level of a battery of a vehicle at location in a key-off state and identify, via a processor, a parking duration for the location. The instructions which, when executed, also cause the machine to activate an infotainment unit responsive to the charge level being greater than a threshold associated with the parking duration and present media via the infotainment unit.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
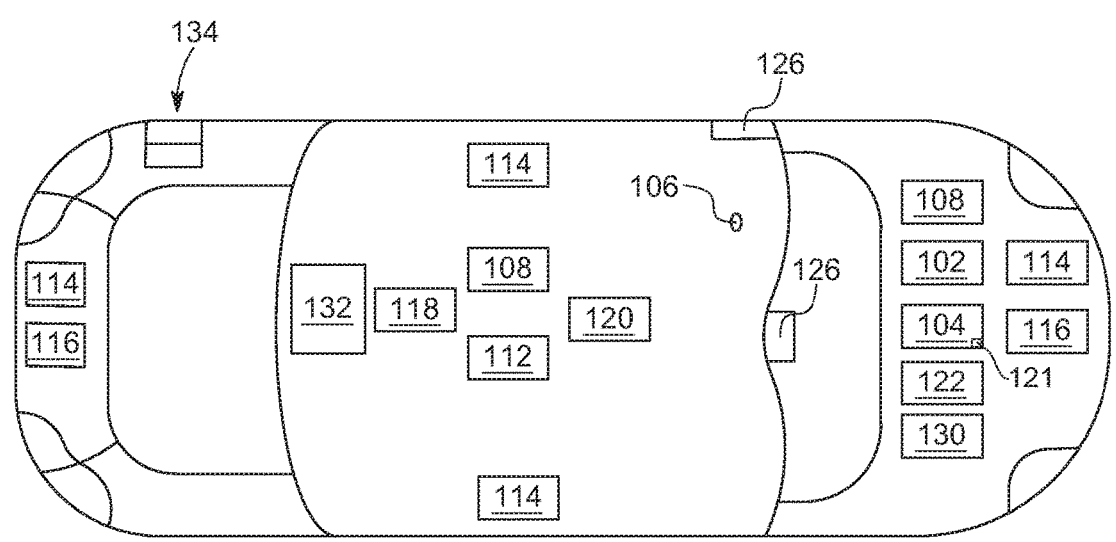
FIG. 1 illustrates an example vehicle in a key-off-state in accordance with the teachings disclosed herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles oftentimes include a plurality of electronic control units. Generally, each of the electronic control units monitor and control various subsystems throughout the vehicle. For instance, some vehicles include electronic control units to monitor and control an engine, a battery, door functions, human-machine interfaces, suspension, cruise-control, telematics, brakes, seats, etc. The electronic control units may include hardware, firmware, circuits, input devices, and/or output devices to monitor and control the corresponding subsystem. Typically, the electronic control units require energy to control the corresponding subsystem of the vehicle. For example, the door control unit consumes energy to perform electronic functions of the door. In instances in which an engine of the vehicle is turned off, electronic control units may draw energy from a battery (e.g., a starter battery) of the vehicle. In such instances, the battery may become discharged or drained if too many electronic control units are drawing energy from the battery and/or the electronic control units draw energy from the battery for an extended period of time.

Example systems, apparatus, methods, and computer readable media disclosed herein prioritize electronic control units of a vehicle to enable one or more of the electronic control units to operate while the vehicle is in a key-off state without causing a battery of the vehicle to become discharged or drained.

Some example vehicles disclosed herein include a communication module that is to receive an activation signal when the vehicle is in a sleep mode and parked at a location associated with an event (e.g., a work shift, a sporting event, a showing at a movie theater, etc.). A telematic control unit of the example vehicle is to activate upon the communication module receiving the activation signal from a remote processor. For example, the remote processor determines the location of the vehicle, identify the event and an event time of the event based upon the location, and sends an activation signal to vehicle based upon the end time. The communication module receives the activation signal from the remote processor, and the telematic control unit activates upon the communication module receiving the activation signal to determine and present a route from the location (e.g., a preferred route to a target destination) prior to and/or as a driver approaches the vehicle.

Some example vehicles disclosed herein include a communication module that is to receive an activation signal when the vehicle is in a key-off state and damage has been caused to the vehicle. The vehicle of such examples includes one or more sensors that collect damage detection data for a predetermined amount of time while the vehicle is in the key-off state. The communication module is to send the damage detection data to a remote processor, and the remote processor is to detect whether damage has been caused to the vehicle based upon the damage detection data. Upon detecting that damage has been caused to the vehicle, the remote processor sends the activation signal to the communication module to cause a camera module of the vehicle to activate. The camera module includes a camera that collects damage identification data to identify a type, a location on the vehicle, a severity, and/or a source of the damage caused to the vehicle.

Some example vehicles disclosed herein include a communication module that is to receive an activation signal when the vehicle is in a key-off state. The activation signal is to be received from a remote processor that determines a charge level of a battery of the vehicle and identify a parking duration for the vehicle at the location. If the charge level is greater than a threshold associated with the parking duration, the remote processor sends the activation signal to the communication module to activate an electronic control unit of the vehicle. For example, the remote processor sends the activation signal to activate an infotainment unit to present media while the vehicle remains parked at a fueling station, a post-office, and/or at any location associated with a short parking duration.

As used herein, a "sleep mode" refers to a setting of a vehicle in which energy consumption of electronic control units of the vehicle are reduced to a minimal operating level to reduce energy consumption while the vehicle is not being operated. As used herein, an "active mode" refers to a setting of a vehicle in electronic control units are fully functional. As used herein, a "charge level" and a "state-of-charge" of a battery refer to a measurement of an amount of energy stored within a battery.

Turning to the figures, FIG. 1 illustrates an example vehicle 100 in accordance with the teachings disclosed herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). The vehicle 100 of the illustrated example includes an engine 102, a battery 104, an ignition switch 106, a communication module 108 (e.g., a first communication module), a global positioning server (GPS) receiver 110, and another communication module 112 (e.g., a second communication module).

The engine 102 includes an internal combustion engine, an electric motor, and/or any other power source that propels movement of the vehicle 100. In some examples, the battery 104 is a starter battery that provides energy to an internal combustion engine of the engine 102 to activate the internal combustion engine. Once activated, power is supplied to the internal combustion engine via an alternator. In some examples, the battery 104 is electrically connected to an electric motor of the engine 102 and provides electricity to the electric motor to enable the electric motor to propel the vehicle 100. In such examples, the battery 104 may include a single battery cell and/or a battery pack that includes a plurality of battery cells connected together.

The ignition switch 106 is utilized by a driver and/or another user of the vehicle 100 to operate the engine 102, the battery 104, and/or electronic accessories of the vehicle 100. For example, the ignition switch 106 includes an on-position corresponding to an on-state of the vehicle 100 during which the engine 102 and the electronic accessories are activated, an accessory-position corresponding to an accessory-state during which electronic accessories of the vehicle 100 are activated without the engine 102 being activated, and an off-position corresponding to a key-off state during which the engine 102 is inactive and one or more of the electronic components are in a sleep mode and/or inactive.

The communication module 108 includes wired or wireless network interfaces to enable communication with external networks. The communication module 108 also includes hardware (e.g., processors, memory, storage, antenna, etc.) and software to control the wired or wireless network interfaces. In the illustrated example, the communication module 108 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m), Wireless Gigabit (IEEE 802.11ad), etc.). The communication module 108 communicates with an external network (e.g., a network 216 of FIG. 2). The external network(s) may be a public network, such as the Internet; a private network, such as an intranet; or combinations thereof, and may utilize a variety of networking protocols now available or later developed including, but not limited to, TCP/IP-based networking protocols.

The GPS receiver 110 of the illustrated example receives a signal from a global positioning system (GPS) to determine a location of the vehicle 100. For example, the GPS receiver 110 determines longitudinal and latitudinal coordinates of the vehicle 100, the location of the vehicle 100, the location of the vehicle 100 on a map, the location of the vehicle 100 relative to landmarks (e.g., stadiums, restaurants, fueling stations), etc.

The communication module 112 is a short-range wireless module that communicates with a key fob or a mobile device (e.g., a smart phone) functioning as a phone-as-a-key (PaaK) to unlock door(s) of the vehicle 100, remote start the vehicle, activate settings of the vehicle 100, etc. The communication module 112 includes the hardware and firmware to establish a connection with the key fob and/or the mobile device. In some examples, the communication module 112 implements the Bluetooth and/or Bluetooth Low Energy (BLE) protocols. The Bluetooth and BLE protocols are set forth in Volume 6 of the Bluetooth Specification 4.0 (and subsequent revisions) maintained by the Bluetooth Special Interest Group.

The vehicle 100 of the illustrated example also includes one or more proximity sensors 114, one or more cameras 116, a tilt sensor 118, an accelerometer 120, and a battery sensor 121.

The proximity sensors 114 detect when an object (e.g., another vehicle, a person, etc.) is located near the vehicle 100 and determine a proximity of the detected object to the vehicle 100. The proximity sensors 114 include radar sensor(s), lidar sensor(s), ultrasonic sensor(s) and/or any other type of sensor(s) that are capable of detecting an object and determining a proximity to the detected object. A lidar sensor detects and determines a distance to an object via lasers, a radar sensor detects and determines a distance to an object via radio waves, and an ultrasonic sensor detects and determines a distance to an object via ultrasound waves. In the illustrated example, one of the proximity sensors 114 is located on each side of the vehicle 100 (e.g., a front side, a rear side, a driver side, a passenger side) to facilitate detection of object(s) throughout a surrounding area of the vehicle 100. In other examples, the vehicle may include more or less of the proximity sensors 114 and/or the proximity sensors 114 may be located at different positions throughout the vehicle 100.

The cameras 116 are positioned on the vehicle 100 to collect image(s) and/or video of the surrounding area of the vehicle 100. The image(s) and/or video are analyzed (e.g., by a camera module 228 and/or a body control module 230 of FIG. 2) to detect when an object is located near the vehicle 100 and determine a proximity of the detected object to the vehicle 100. In the illustrated example, one of the cameras 116 is located on the front side of the vehicle 100 to facilitate detection of object(s) located in front of the vehicle 100, and another one of the cameras 116 is located on the rear side of the vehicle 100 to facilitate detection of object(s) located behind the vehicle 100. In other examples, the vehicle may include more or less of the proximity sensors 114 and/or the proximity sensors 114 may be located at different positions (e.g., on the driver side, on the passenger side, etc.) throughout the vehicle 100.

The tilt sensor 118 of the illustrated example detects when the vehicle 100 is tilted and/or when a portion of the vehicle 100 has been lifted from a ground surface. The accelerometer 120 detects an acceleration at which the vehicle 100 moves. In some examples, the tilt sensor 118 and/or the accelerometer 120 are included in an inertial measurement unit (e.g., an inertial measurement unit 224 of FIG. 2) and/or an anti-lock brake system module. Further, the battery sensor 121 monitors characteristics of the battery 104. The battery sensor 121 detects and/or otherwise determines a current, a voltage, a charge level, and/or a temperature of the battery 104. For example, the battery sensor 121 detects that the current of the battery 104 is greater than 0 Amps when the battery 104 is being recharged and detects that the current of the battery 104 is less than 0 Amps when the battery 104 is being discharged. In some examples, the battery sensor 121 is attached to a lead of the battery 104 to enable the battery sensor 121 to monitor the characteristics of the battery 104.

In the illustrated example, the vehicle 100 also includes another communication module 122 (e.g., a third communication module), an infotainment head unit 124 including a display 126 and one or more speakers 128, and an HVAC unit 130.

The communication module 122 is a dedicated short-range communication (DSRC) module that includes antenna(s), radio(s) and software to broadcast messages and to establish connections with module(s) of mobile device(s) (e.g., smart phones, smart watches, wearables, tablets, etc.), other vehicle(s) (e.g., vehicle-to-vehicle (V2V) communication), and infrastructure (e.g., vehicle-to-infrastructure (V2X) communication). Information on how DSRC networks communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA %20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones. Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.)

The infotainment head unit 124 provides an interface between the vehicle 100 and a user. The infotainment head unit 124 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, the display 126 (e.g., a center console display such as a liquid crystal display (LCD), an organic light emitting diode (OLED) display, a flat panel display, a solid state display, etc.), and/or the speakers 128. In the illustrated example, the infotainment head unit 124 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 124 may display the infotainment system on, for example, the display 126.

The HVAC unit 130 of the illustrated example adjusts, maintains, and/or otherwise affects an environment within a cabin of the vehicle 100. The HVAC unit 130 includes vents, a heater, and/or an air conditioner to control a temperature and/or a moisture level within the cabin of the vehicle 100. For example, settings of the HVAC unit 130 may be adjusted to improve a comfort level of an occupant (e.g., adjusting heat and/or air conditioning) and/or to increase visibility through windows of the vehicle 100 (e.g., defrosting a windshield).

Further, the vehicle 100 of the illustrated example is an electric vehicle and/or a hybrid vehicle that includes a solar panel 132 and an electric vehicle (EV) receptacle 134 to recharge the battery 104. In other examples in which the vehicle 100 is a standard gasoline powered vehicle, the vehicle 100 may include the solar panel 132 to recharge the battery 104 and/or to provide electrical energy components of the vehicle 100. The solar panel 132 captures solar energy (e.g., via sunlight), transforms the solar energy into electricity, and recharges the battery 104 by providing the electricity to the battery 104. The EV receptacle 134 receives a power plug (e.g., an EV plug) of a charging station for recharging the battery 104 by enabling the charging station to provide electricity to the battery 104.

Figure 2:
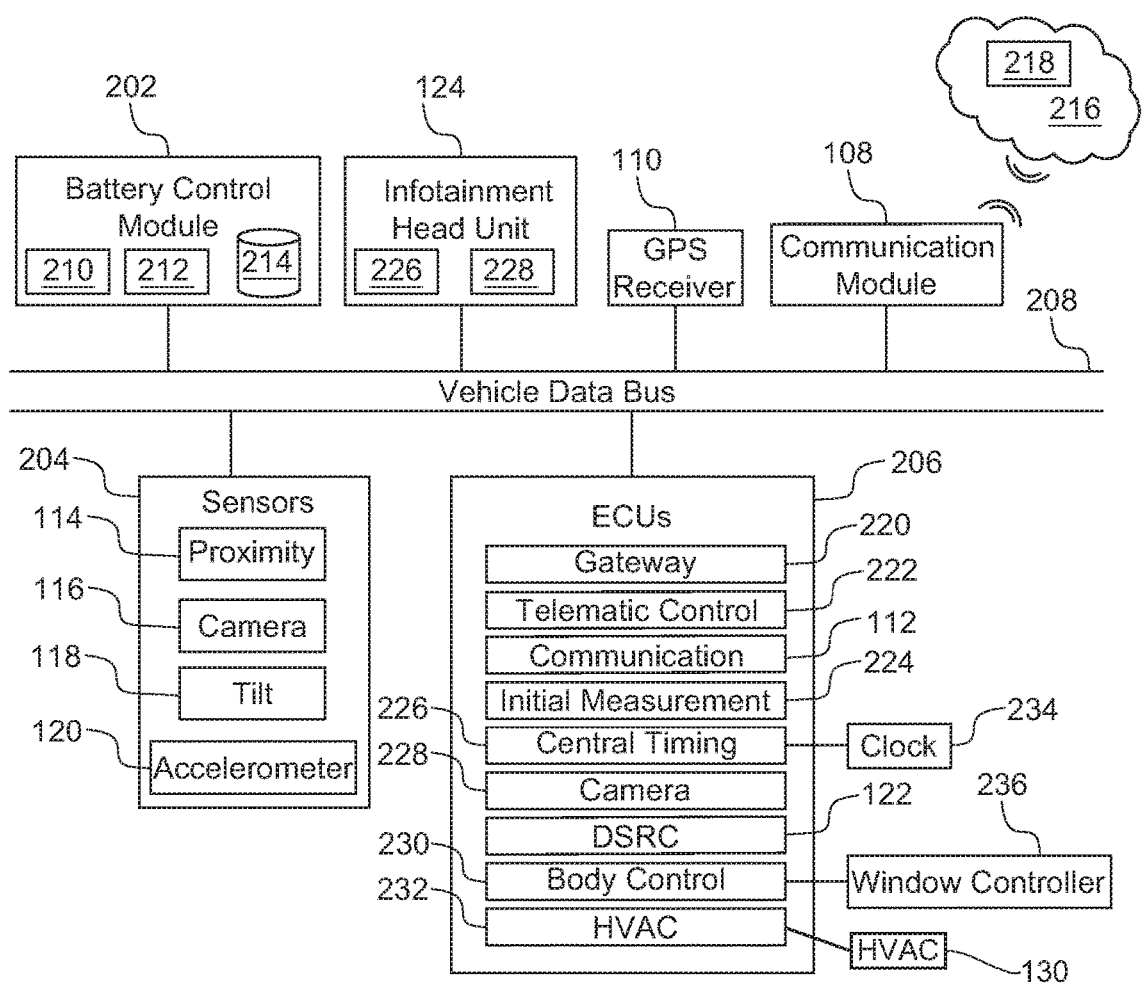
FIG. 2 is a block diagram of electronic components of the vehicle of FIG. 1.

FIG. 2 is a block diagram of electronic components 200 of the vehicle 100. As illustrated in FIG. 2, the electronic components 200 include a battery control module 202, the infotainment head unit 124, the GPS receiver 110, the communication module 108, sensors 204, control modules or electronic control units (ECUs) 206, and a vehicle data bus 208.

The battery control module 202 monitors and controls the battery 104 of the vehicle 100. For example, the battery control module 202 monitors the characteristics (e.g., voltage, current, state-of-charge, temperature, etc.) of the battery 104, calculates other characteristics (e.g., internal impedance, charge delivered and stored, energy delivered since last charge, etc.) of the battery 104, communicates with the sensors 204 and/or the ECUs 206, controls discharging and/or recharging of the battery 104, etc.

The battery control module 202 includes a microcontroller unit, controller or processor 210; memory 212; and a database 214. For example, the database 214 stores data collected by one or more of the sensors 204, the GPS receiver 110, the communication module 122, and/or any other device of the vehicle 100. The processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 210 during execution of the instructions.

As illustrated in FIG. 2, the communication module 108 wirelessly communicates with a network 216. For example, the network 216 is a public network, such as the Internet; a private network, such as an intranet; or combinations thereof, and may utilize a variety of networking protocols now available or later developed including, but not limited to, TCP/IP-based networking protocols. The network 216 of the illustrated example includes a remote processor 218 (e.g., a server) that collects, stores, analyzes, determines, and/or communicates information related to the battery 104 of the vehicle 100. For example, the remote processor 218 collects a charge level of the battery 104 and/or a parked location of the vehicle 100 via the communication module 108, stores the last measured charge level of the battery 104, analyzes the collected data to determine or estimate a current charge level of the vehicle 100 in a key-off state, prioritizes activation of the ECUs 206, and sends instruction(s) to activate one or more of the ECUs 206 while the vehicle 100 is in the key-off state.

The remote processor 218 of the illustrated example includes wired or wireless network interfaces to enable communication with the communication module 108 of the vehicle 100. The remote processor 218 also includes hardware (e.g., processors, memory, storage, antenna, etc.) and software to control the wired or wireless network interfaces. For example, the remote processor 218 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.).

The sensors 204 are arranged in and around the vehicle 100 to monitor properties of the vehicle 100 and/or an environment in which the vehicle 100 is located. One or more of the sensors 204 may be mounted to measure properties around an exterior of the vehicle 100. Additionally or alternatively, one or more of the sensors 204 may be mounted inside a cabin of the vehicle 100 or in a body of the vehicle 100 (e.g., an engine compartment, wheel wells, etc.) to measure properties in an interior of the vehicle 100. For example, the sensors 204 include accelerometers, odometers, tachometers, pitch and yaw sensors, wheel speed sensors, microphones, tire pressure sensors, biometric sensors and/or sensors of any other suitable type. In the illustrated example, the sensors 204 include the proximity sensors 114, the cameras 116, the tilt sensor 118, the accelerometer 120, and the battery sensor 121.

The ECUs 206 monitor and control the subsystems of the vehicle 100. For example, the ECUs 206 are discrete sets of electronics that include their own circuit(s) (e.g., integrated circuits, microprocessors, memory, storage, etc.) and firmware, sensors, actuators, and/or mounting hardware. The ECUs 206 communicate and exchange information via a vehicle data bus (e.g., the vehicle data bus 208). Additionally, the ECUs 206 may communicate properties (e.g., status of the ECUs 206, sensor readings, control state, error and diagnostic codes, etc.) to and/or receive requests from each other. For example, the vehicle 100 may have seventy or more of the ECUs 206 that are positioned in various locations around the vehicle 100 and are communicatively coupled by the vehicle data bus 208.

In the illustrated example, the ECUs 206 include a gateway module 220, a telematic control unit (TCU) 222, the communication module 112, an inertial measurement unit (IMU) 224, a central timing module 226, a camera module 228 that includes one or more of the cameras 116, the communication module 122, a body control module 230, and an HVAC module 232. For example, the gateway module 220 facilitates communication between different communication protocols of the vehicle 100. Additionally or alternatively, the gateway module 220 facilitates communication between the communication module 108 and the network 416, for example, via a cellular data link. The telematic control unit (TCU) 222 controls tracking of the location of the vehicle 100. For example, the telematic control unit 222 includes and/or communicates with the GPS receiver 110 that receives the location of the vehicle 100. The inertial measurement unit 224 monitors a longitudinal acceleration, a latitudinal acceleration, a yaw rate, a pitch rate, a roll rate, and/or any other characteristic related to a current movement status of the vehicle 100. For example, the inertial measurement unit 224 includes the tilt sensor 118 that detects when the vehicle 100 is tilted and/or a portion of the vehicle 100 is lifted and includes the accelerometer 120 that detects an acceleration (e.g., longitudinal, latitudinal) of the vehicle 100. Further, the central timing module 226 includes and/or is in communication with a clock 234 to determine monitor the time. The communication module 122 (e.g., the DSRC module) wirelessly communicates with other nearby communication module(s). For example, the communication module 122 collects data from a communication module of a nearby vehicle via vehicle-to-vehicle communication and/or from a communication module of an infrastructure unit via vehicle-to-infrastructure communication. The body control module 230 controls one or more subsystems throughout the vehicle 100, such as power windows, power locks, an immobilizer system, power mirrors, etc. For example, the body control module 230 includes circuits that drive one or more of relays (e.g., to control wiper fluid, etc.), brushed direct current (DC) motors (e.g., to control power seats, power locks, power windows, wipers, etc.), stepper motors, LEDs, etc. For example, the body control module 230 is communicatively coupled to a window controller 236 to electronically control operation (e.g., opening, closing) of one or more windows of the vehicle 100. Additionally, the HVAC module 232 is communicatively coupled to the HVAC unit 130 to control and/or adjust settings (e.g., air conditioning settings, heat settings, flow rate settings, defrost settings, etc.) of the HVAC unit 130. In some examples, the ECUs 206 also include an anti-lock brake system (ABS) module that includes accelerometer(s) (e.g., a multi-axial accelerometer) and/or wheel speed sensors that detect wheel rotation (e.g., upon impact from a collision).

The vehicle data bus 208 communicatively couples the communication module 108, the GPS receiver 110, the infotainment head unit 124, the battery control module 202, the sensors 204, and the ECUs 206. In some examples, the vehicle data bus 208 includes one or more data buses. The vehicle data bus 208 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
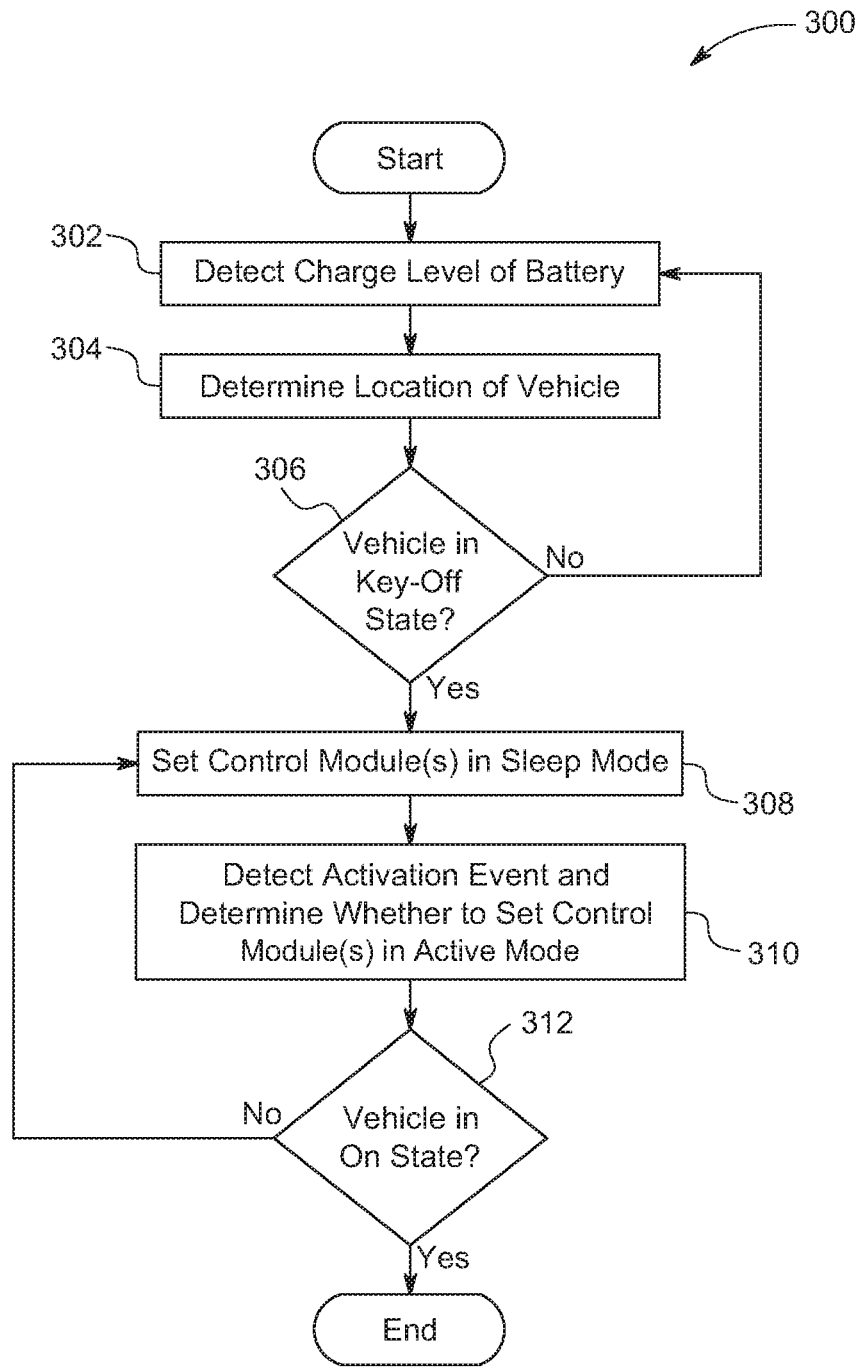
FIG. 3 is a flowchart for setting control module(s) of the vehicle of FIG. 1 in an active state in accordance with the teachings herein.

FIG. 3 is a flowchart of an example method 300 to set one or more control modules in active state for a vehicle in a key-off state. The flowchart of FIG. 3 is representative of machine readable instructions that are stored in memory (such as the memory 212 of FIG. 2) and include one or more programs which, when executed by a processor (such as the processor 210 of FIG. 2), cause the example vehicle 100 of FIG. 1 to activate one or more of the example ECUs 206 of FIG. 2 when the example vehicle 100 is in a key-off state. While the example program is described with reference to the flowchart illustrated in FIG. 3, many other methods for activating control modules of a vehicle in a key-off state may alternatively be used. For example, the order of execution of the blocks may be rearranged, changed, eliminated, and/or combined to perform the method 300. Further, because the method 300 is disclosed in connection with the components of FIGS. 1-2, some functions of those components will not be described in detail below.

Initially, at block 302, the battery sensor 121 detects a charge level of the battery 104 of the vehicle 100, and the remote processor 218 collects or determines the charge level of the battery 104 via the communication module 108 of the vehicle 100. At block 304, the GPS receiver 110 (e.g., of the telematic control unit 222) determines a location of the vehicle 100, and the remote processor 218 collects or determines the location of the vehicle 100 via the communication module 108. For example, the communication module 108 sends a vehicle status signal that includes the charge level and the location of the vehicle 100 to the remote processor 218 prior to the vehicle 100 being in a key-off state.

At block 306, the remote processor 218 determines whether the vehicle 100 is in a key-off state. For example, the remote processor 218 determines that the vehicle 100 is in the key-off state responsive to the vehicle 100 not receiving a signal from the communication module 108 of the vehicle 100 for a predetermined amount of time. In other examples, the communication module 108 sends a key-off signal to the remote processor 218 immediately prior to the vehicle transitioning to the key-off state. Upon the remote processor 218 determining that the vehicle is not in the key-off state (e.g., an on-state, an accessory state), the method 300 returns to block 302 so that the vehicle 100 receives an updated charge level of the battery 104 an updated location of the vehicle 100. Blocks 302, 304, 306 are repeated until the remote processor 218 determines that the vehicle is in the key-off state. Upon the remote processor 218 determining that the vehicle is in the key-off state, the method 300 proceeds to block 308. At block 308, the processor 210 of the vehicle 100 causes one or more of the ECUs 206 (e.g., control modules) to transition from an active mode to a sleep mode to conserve the charge level of the battery 104 while the vehicle 100 is in the key-off state.

At block 310, the remote processor 218 detects an activation event and determines whether to set a corresponding one or more of the ECUs 206 in an active mode. For example, if the remote processor 218 determines an event for which the vehicle 100 is parked is ending, the remote processor 218 determines whether to activate the telematic control unit 422 to determine a route from the location at which the vehicle 100 is parked. If the remote processor 218 determines that damage has been caused the vehicle 100 while the vehicle 100 is parked, the remote processor 218 determines whether to activate one or more of the ECUs 206 (e.g., the communication module 122, the inertial measurement unit 224, the central timing module 226) to collect data related to the damage caused to the vehicle 100. Further, if the remote processor 218 determines that the vehicle 100 is parked at location associated with a short parking duration, the remote processor 218 determines whether to activate one or more of the ECUs 206 (e.g., the communication module 122, the body control module 230, the HVAC module 232) for a driver of the vehicle 100.

At block 312, the remote processor 218 determines whether the vehicle 100 is in the on-state. For example, the remote processor 218 determines that the vehicle 100 is in the on-state upon receiving a signal from the communication module 112 of the vehicle 100 indicating that the vehicle 100 is in the on-state. Response to the vehicle 100 remaining in the key-off state and not being in the on-state, the method 300 returns to block 308. Blocks 308, 310, 312 are repeated until the remote processor 218 determines that the vehicle 100 is in the on-state. Otherwise, response to the remote processor 218 determining that the vehicle 100 is in the key-off state, the method 300 ends.

Figure 4:
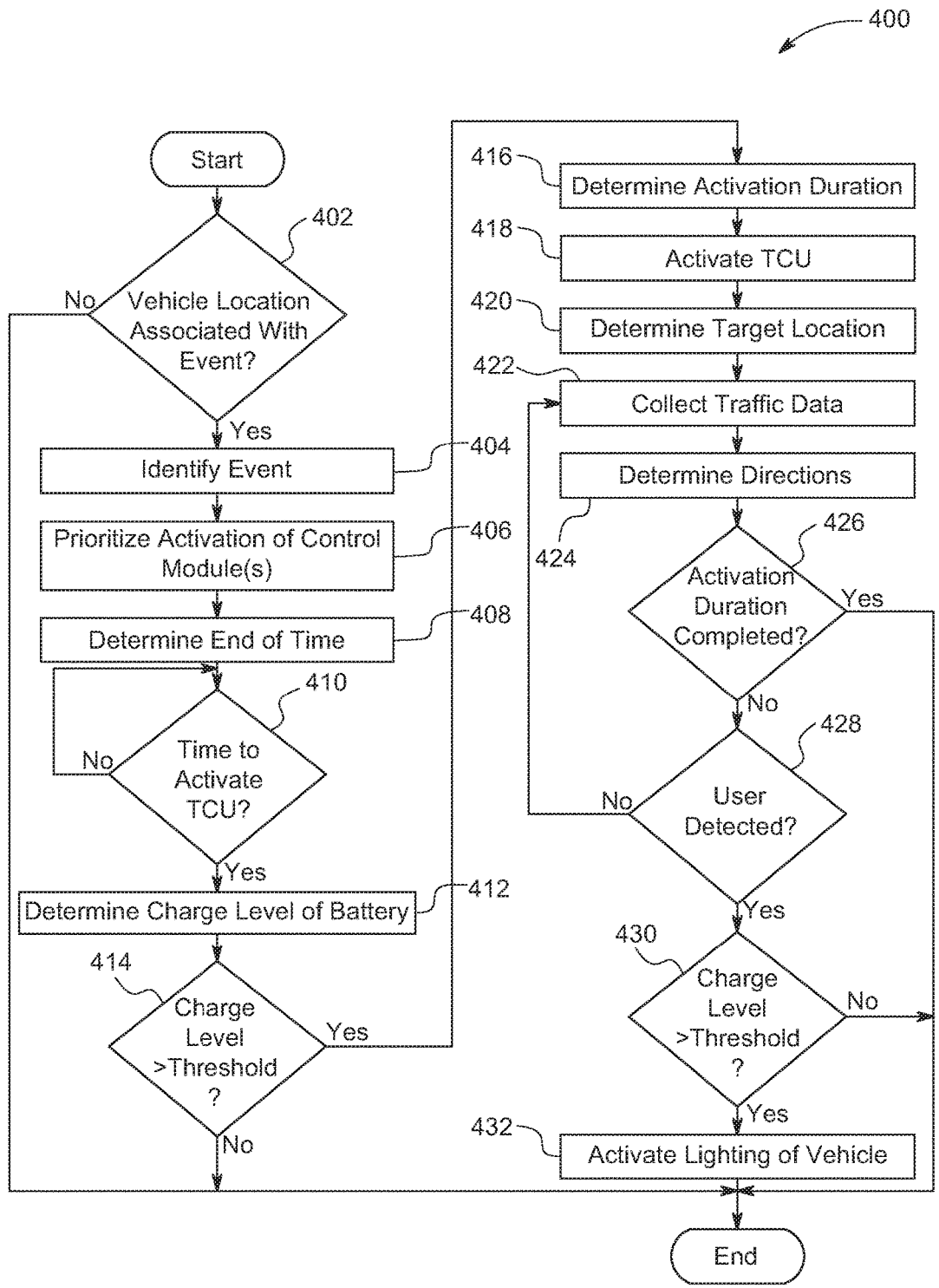
FIG. 4 is a flowchart for setting the control module(s) of FIG. 3 in the active state to determine driving directions from an identified event

FIG. 4 is a flowchart of an example method 400 to implement block 310 of FIG. 3 to determine driving directions from an event. The flowchart of FIG. 4 is representative of machine readable instructions that are stored in memory (such as the memory 212 of FIG. 2) and include one or more programs which, when executed by a processor (such as the processor 210 of FIG. 2), cause the example vehicle 100 of FIG. 1 to activate one or more of the example ECUs 206 of FIG. 2 when the example vehicle 100 is in a key-off state to determine driving directions from an event. While the example program is described with reference to the flowchart illustrated in FIG. 4, many other methods for determining driving direction from an event may alternatively be used. For example, the order of execution of the blocks may be rearranged, changed, eliminated, and/or combined to perform the method 400. Further, because the method 400 is disclosed in connection with the components of FIGS. 1-2, some functions of those components will not be described in detail below.

Initially, at block 402, the remote processor 218 determines whether the location of the vehicle 100 is associated with an event (e.g., a sporting event, work, a movie, etc.). In some examples, the remote processor 218 accesses a personal calendar of the driver (e.g., via communication with the vehicle 100 and/or a mobile device of the driver) to identify whether the location is associated with an event. In response to determining that the location of the vehicle 100 is not associated with an event, the method 400 ends. In response to determining that the location of the vehicle 100 is associated with an event, the method 400 proceeds to block 404 at which the remote processor 218 identifies the event. For example, if the remote processor 218 identifies that the vehicle 100 is parked in a parking lot associated with a sporting event (e.g., a baseball game), the remote processor 218 identifies that the event is the sporting event. If the remote processor 218 identifies that the vehicle 100 is parked at location near an office at which the driver works (e.g., based upon information provided by the driver, based upon analysis of driving history of the driver and/or the vehicle 100, etc.), the remote processor 218 identifies that the event is a work shift.

At block 406, the remote processor 218 prioritizes activation of the ECUs 206 (e.g., control modules) of the vehicle 100. For example, the remote processor 218 determines which of the ECUs 206 are to be activated, and in which order, while the vehicle 100 remains in the key-off state to prevent activation of one or more of the ECUs 206 from causing the battery 104 to become discharged. The remote processor 218 prioritizes activation of the ECUs 206 based upon the location of the vehicle 100. For example, when the vehicle 100 is parked at a location associated with a sporting event or the driver's place of employment, the remote processor 218 prioritizes the gateway module 220, the battery control module 202, and/or the telematic control unit 222.

At block 408, the remote processor 218 determines an end time of the event identified at block 404 based on the location of the vehicle 100. For example, the remote processor 218 may communicate with a public network to determine when the event (e.g., a showing at a movie theatre) is scheduled to end to determine the end time of the event (e.g., the movie is scheduled to end at 9:25 PM). In other examples, the remote processor 218 may communicate with a public network to track the event (e.g., a sporting event) in real-time to determine the end time of the event (e.g., the public network identifies that the game has ended at 8:39 PM). Additionally or alternatively, the remote processor 218 may evaluate previous occurrences of the event (e.g., a work shift) to predict an end time of the event (e.g., the driver typically leaves the office at 5:45 PM on Thursdays). For example, based upon previous parking data provided by the vehicle 100 and/or other vehicles, the remote processor 218 utilizes cloud-based learning to determine a typical parking duration or end time for a geo-fenced area that includes the location at which the vehicle 100 is parked for the event. Further, in some examples, the remote processor 218 identifies the end time of the event based on the personal calendar of the driver.

Further, the remote processor 218 determines when to activate one or more of the ECUs 206 of the vehicle 100 based on the end time of the event. In some examples, the remote processor 218 determines to activate one or more of the ECUs 206 of the vehicle 100 at the end time of the event. For example, if the vehicle 100 is parked immediately outside of an office of the driver, the remote processor 218 may activate one or more of the ECUs 206 at the predicted end time of the work shift of the driver. In other examples, the remote processor 218 determines to activate one or more of the ECUs 206 of the vehicle 100 at a predetermined amount of time after the end time of the event. For example, if the remote processor 218 identifies that it typically takes someone 20 minutes to reach a vehicle at the parking location of the vehicle 100 after the end of the sporting event, the remote processor 218 may activate one or more of the ECUs 206 20 minutes after the end time of the sporting event.

At block 410, the remote processor 218 determines whether it is time to activate the telematic control unit 222 to determine a travel route from the location of the vehicle 100. In response to determining that it is not time to activate the telematic control unit 222, the method 400 returns to block 410. In response to determining that it is time to activate the telematic control unit 222, the method 400 continues to block 412.

At block 412, the remote processor 218 determines a current charge level of the battery 104 of the vehicle 100. When the battery control module 202 is set to sleep mode at block 308 of the method 300 of FIG. 3, the remote processor 218 is unable to collect the current charge level of the battery 104 via the battery sensor 121. To determine the current charge level, the remote processor 218 calculates the current charge level of the battery 104 based upon the charge level of the battery 104 prior to the vehicle 100 being in the key-off state (e.g., received vehicle status signal sent from the communication module 108 of the vehicle 100 prior to block 306 of the method 300 of FIG. 3) and a time duration of the vehicle 100 being in the key-off state. For example, the charge level of the battery 104 decreases over time as the vehicle 100 is in the key-off state. Thus, the longer the vehicle 100 is in the key-off state, the more charge the remote processor 218 reduces from the last measured charge level to determine the current charge level of the battery 104. In some examples, the remote processor 218 identifies a discharge rate at which the charge level of the battery 104 reduces based on a make, a model, a body type, an options package, and/or any other characteristic of the vehicle 100. Further, in some examples, the remote processor 218 determines the current charge level of the battery 104 based upon whether and to what extent the battery 104 battery has been recharged via solar panel 132, the EV receptacle 134, and/or any other charging source. For example, the solar panel 132 may reduce and/or negate the discharge rate of the battery 104 over time.

At block 414, the remote processor 218 determines whether the current charge level of the battery 104 is greater than a predetermined charge threshold. For example, the predetermined charge threshold corresponds to a minimum charge level that enables the telematic control unit 222 to be activated for a predetermined amount of time (e.g., a minimum activation duration) without causing the battery 104 of the vehicle 100 to become discharged. In response to the remote processor 218 determining that the current charge level of the battery 104 is not greater than the predetermined charge threshold, the method 400 ends. In some examples, the battery control module 202 (e.g., via the communication module 108) and/or the remote processor 218 notifies the driver via a mobile device that the battery 104 has a low charge level. Additionally or alternatively, the battery control module 202 may cause the vehicle 100 to start autonomously for a period of time when the vehicle 100 is outdoors (e.g., determined via the GPS receiver 110) to enable the battery 104 to recharge over time. In such examples, the battery control module 202 may not cause the vehicle 100 to start autonomously when the vehicle is indoors to avoid carbon monoxide buildup within the indoor facilities. Otherwise, in response to the remote processor 218 determining that the current charge level of the battery 104 is greater than the predetermined charge threshold, the method 400 proceeds to block 416. At block 416, the remote processor 218 determines, based upon the current charge level, an activation duration during which the telematic control level without causing the battery 104 to become discharged. That is, the remote processor 218 determines the activation duration during which the telematic control level is activated to prevent the battery 104 of the vehicle 100 from being discharged.

At block 418, the remote processor 218 sends an activation signal to the communication module 108 of the vehicle 100 and the communication module 108 receives the activation signal to activate the telematic control unit 222. For example, the remote processor 218 sends the activation signal based upon the end time (e.g., at a predetermined time period after the end time), the communication module 108 receives the activation signal, the gateway module 220 causes the battery control module 202 to activate upon the communication module 108 receiving the activation signal, and the battery control module 202 subsequently activates the telematic control unit 222. That is, the remote processor 218 activates the telematic control unit 222 in response to determining that the current charge level of the battery 104 is greater than the predetermined charge level.

At block 420, the telematic control unit 222 determines a target destination for the vehicle 100. In some examples, the telematic control unit 222 predicts and/or otherwise determines the target destination for the vehicle 100 based upon driving history of the vehicle 100 and/or the driver. For example, if the location of the vehicle 100 is associated with a work site of the driver, the telematic control unit 222 determines that the target destination of the vehicle 100 is a home of the driver. In some examples, the telematic control unit 222 determines the target destination based upon the personal calendar of the driver. At block 422, the telematic control unit 222 collects traffic data, map data, and/or weather condition data. For example, the telematic control unit 222 collects map data, traffic data, and/or weather condition data from an external server via the communication module 108.

At block 424, the telematic control unit 222 determines a route from the location at which the vehicle 100 is parked to the target destination. In some examples, the telematic control unit 222 determines a quickest driving route from the location of the vehicle 100 to the target destination. For example, the telematic control unit 222 determines the quickest driving route from the location of the vehicle 100 to the target destination based upon map data, traffic data, driver history data, weather condition data, etc. In some examples, the telematic control unit 222 presents, via the display 126, the route from the location of the vehicle 100 upon determining the route. In other examples, the telematic control unit 222 presents, via the display 126, the route from the location of the vehicle 100 upon the driver entering the vehicle 100. Additionally or alternatively, the battery control module 202 causes one of the ECUs 206 to set a driving mode (e.g., a snow mode, a sport mode, etc.) by adjusting powetrain and/or suspension settings and/or presents a corresponding suggested tire pressure based on the target destination, the route, the time of day, weather conditions, etc.

At block 426, the remote processor 218 determines whether the activation duration has completed. In response to determining that the activation duration has completed while the vehicle 100 remains in the key-off state, the method 400 ends such that the telematic control unit 222 and/or one or more of the ECUs 206 is to return to the sleep mode at block 308 of the method 300 of FIG. 3. Further, in some examples, the battery control module 202 causes the method 400 to end and the ECUs 206 to return to sleep mode upon detecting that the battery 104 will become discharged shortly if the ECUs remain in the activated state.

Otherwise, at block 428, the method 400 proceeds to block 428 at which the communication module 112 determines whether a user (e.g., the driver) is near the vehicle 100. For example, the communication module 112 remains in an active mode while the vehicle 100 is in the key-off state to enable the communication module 112 to detect a presence of the user. In response to the communication module 112 not detecting the user, the method 400 returns to block 422. Otherwise, in response to the communication module 112 detecting the user, the method 400 proceeds to block 430. At block 430, the battery control module 202 (e.g., via measurements of the battery sensor 121) determines whether the charge level of the battery 104 is greater than another predetermined charge threshold (e.g., a second charge threshold). For example, the predetermined charge threshold corresponds to a charge level of the battery 104 that is able to activate the body control module 230 of the vehicle 100 without causing the battery 104 to become discharged. In response to the battery control module 202 determining that the charge level is not greater than the predetermined charge threshold, the method 400 ends. Otherwise, in response to the battery control module 202 determining that the charge level is greater than the predetermined charge threshold, the method 400 proceeds to block 432 at which the body control module 230 activates lighting of the vehicle 100 as the user approaches the vehicle 100. For example, the battery control module 202 activates the body control module 230 (e.g., after the communication module 108 receives the activation signal) to enable the body control module 230 to activate the lighting. Upon completing block 432, the method 400 ends.

Figure 5:
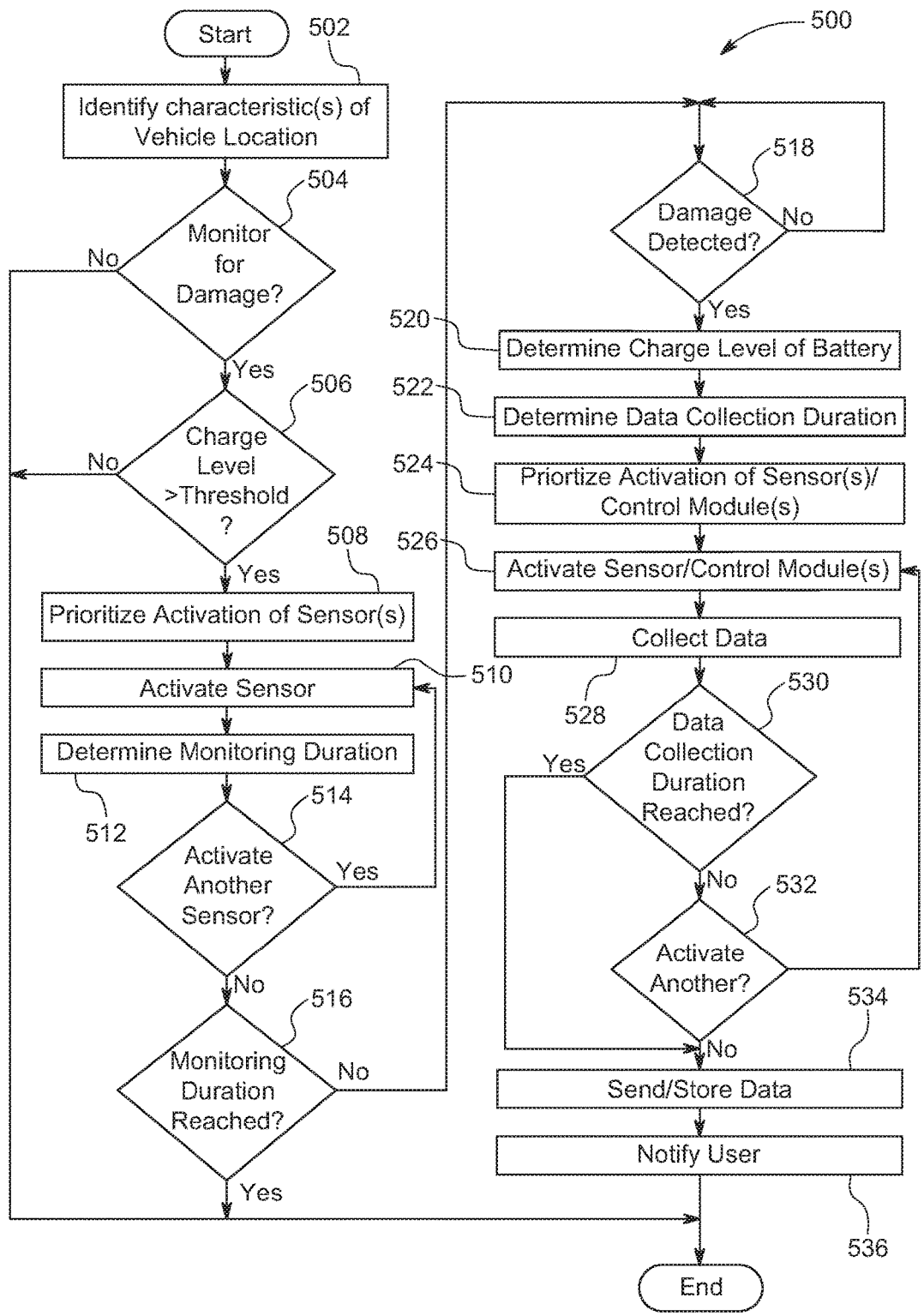
FIG. 5 is a flowchart for setting the control module(s) of FIG. 3 in the active state to detect and collect data related to damage caused to the vehicle of FIG. 1.

FIG. 5 is a flowchart of an example method 500 to implement block 310 of FIG. 3 to detect and collect data related to damage caused to a vehicle. The flowchart of FIG. 5 is representative of machine readable instructions that are stored in memory (such as the memory 212 of FIG. 2) and include one or more programs which, when executed by a processor (such as the processor 210 of FIG. 2), cause the example vehicle 100 of FIG. 1 to activate one or more of the example ECUs 206 of FIG. 2 to detect and collect data related to damage caused to the example vehicle 100. While the example program is described with reference to the flowchart illustrated in FIG. 5, many other methods for detecting and collecting data related to damage caused to a vehicle may alternatively be used. For example, the order of execution of the blocks may be rearranged, changed, eliminated, and/or combined to perform the method 500. Further, because the method 500 is disclosed in connection with the components of FIGS. 1-2, some functions of those components will not be described in detail below.

Initially, at block 502, the remote processor 218 identifies characteristic(s) of the location at which the vehicle 100 is parked. The remote processor 218 determines a likelihood that the vehicle 100 is to be damaged (e.g., collided into, vandalized, etc.) while parked at the location based on the characteristic(s) of the location. For example, if the vehicle 100 is parallel parked next to a busy intersection, the remote processor 218 potentially may determine that the vehicle 100 is more likely to be damaged. If the vehicle 100 is parked in a private or guarded garage, the remote processor 218 potentially may determine that the vehicle 100 is less likely to be damaged. Additionally or alternatively, the remote processor 218 identifies an expected parking duration based upon the location of the vehicle 100. For example, if the vehicle 100 is located at an airport parking lot, the remote processor 218 determines that the vehicle 100 will remain at the location for an extended period of time. In some examples, the remote processor 218 utilizes cloud-based learning to determine the expected parking duration for a geo-fenced area that includes the location of the vehicle 100 based upon previous parking data provided by the vehicle 100 and/or other vehicles.

At block 504, the remote processor 218 determines whether to monitor the vehicle 100 for damage caused to the vehicle 100 while the vehicle 100 is parked at the location. The remote processor 218 determines whether to monitor the vehicle 100 based upon the characteristic(s) of the location and/or the expected parking duration for the vehicle 100. For example, the remote processor 218 is more likely to monitor the vehicle 100 for damage if the characteristic(s) of the location are associated with potential damage to the vehicle 100. The remote processor 218 is less likely to monitor the vehicle 100 if the remote processor 218 determines that the vehicle 100 likely is to be parked at the location for an extended period of time. In response to the remote processor 218 determining not to monitor the vehicle 100 for damage, the method 500 ends. Otherwise, in response to the remote processor 218 determining to monitor the vehicle 100 for damage, the method 500 proceeds to block 506.

At block 506, the remote processor 218 determines whether a current charge level of the battery 104 is greater than a predetermined charge threshold. For example, the remote processor 218 determines the current charge level of the battery 104 and compares it to the predetermined charge threshold. To determine the current charge level, the remote processor 218 calculates the current charge level of the battery 104 based upon the charge level of the battery 104 prior to the vehicle 100 being in the key-off state and a time duration of the vehicle 100 being in the key-off state. For example, the charge level of the battery 104 decreases over time as the vehicle 100 is in the key-off state. The remote processor 218 may identify a discharge rate at which the charge level of the battery 104 reduces based on a make, a model, a body type, an options package, and/or any other characteristic of the vehicle 100. Further, in some examples, the remote processor 218 determines the current charge level of the battery 104 based upon whether and to what extent the battery 104 battery has been recharged via solar panel 132, the EV receptacle 134, and/or any other charging source. Further, the predetermined charge threshold corresponds to a minimum charge level that enables the one or more of the sensors 204 to be activated for a predetermined amount of time (e.g., a minimum activation duration) to detect damage caused to the vehicle 100 without causing the battery 104 of the vehicle 100 to become discharged.

In response to the remote processor 218 determining that the current charge level of the battery 104 is not greater than the predetermined charge threshold, the method 500 ends. In some examples, the battery control module 202 (e.g., via the communication module 108) and/or the remote processor 218 notifies the driver via a mobile device that the battery 104 has a low charge level. Additionally or alternatively, the battery control module 202 may cause the vehicle 100 to start autonomously for a period of time when the vehicle 100 is outdoors (e.g., determined via the GPS receiver 110) to enable the battery 104 to recharge over time. In such examples, the battery control module 202 may not cause the vehicle 100 to start autonomously when the vehicle is indoors to avoid carbon monoxide buildup within the indoor facilities. Otherwise, in response to the remote processor 218 determining that the current charge level of the battery 104 is greater than the predetermined charge threshold, the method 500 proceeds to block 508.

At block 508, the remote processor 218 prioritizes activation of one or more of the sensors 204 (e.g., one or more of the proximity sensors 114 of the body control module 230, one or more of the cameras 116 of the camera module 228, the tilt sensor 118 and/or the accelerometer 120 of the inertial measurement unit 224, one or more wheel speed sensors of an ABS module). At block 510, one of the sensors 204 is activated to collect damage detection data. The damage detection data is collected by one or more of the sensors 204 to identify if and when the vehicle 100 has been damaged while in the key-off state. For example, to activate one of the sensors 204, the remote processor 218 sends an activation signal to the communication module 108, the gateway module 220 causes the battery control module 202 to activate upon the communication module 108 receiving the activation signal, and the battery control module 202 subsequently activates one of the ECUs 206 (e.g., the inertial measurement unit 224) for a corresponding one of the sensors 204 (the tilt sensor 118). In some such examples, the battery control module 202 may return to sleep mode upon activating one or more of the ECUs 206 (e.g., control modules). At block 512, the remote processor 218 and/or the battery control module 202 determines, based upon the current charge level, a monitoring duration during which the one or more of the sensors 204 is to monitor for damage detection data. The monitoring duration is determined to prevent the battery 104 of the vehicle 100 from being discharged due to collection of the damage detection data.

At block 514, the remote processor 218 determines whether to activate another one of the sensors 204 to monitor for damage detection data while the vehicle 100 is in the key-off state. For example, the remote processor 218 determines whether to activate another one of the sensors 204 based upon the current charge level of the battery 104. In response to the remote processor 218 determining to activate another one of the sensors 204, the method 500 returns to block 510. Otherwise, in response to the remote processor 218 determining not to activate another one of the sensors 204, the method 500 proceeds to block 516 at which the remote processor 218 determines whether the monitoring duration has been reached. In response to the remote processor 218 determining that the monitoring duration has been reached, the method 500 ends. Otherwise, in response to the remote processor 218 determining that the monitoring duration has not been reached, the method proceeds to block 518.

At block 518, the remote processor 218 detects whether damage has been caused to the vehicle 100 based upon the damage detection data collected by one or more of the sensors 204 activated at block 508. For example, the one or more of the sensors 204 collect the damage detection data and send the damage detection data to the remote processor 218 via the communication module 108. The remote processor 218 receives the damage detection data from the communication module 108 and analyzes the damage detection data to detect whether damage has been caused to the vehicle 100 while in the key-off state. For example, the remote processor 218 determines that the vehicle 100 has been damaged if the damage detection data collected by one or more of the proximity sensors 114 and/or one or more of the cameras 116 indicates that an object (e.g., another vehicle) and/or a person has contacted the vehicle 100. Additionally or alternatively, the remote processor 218 determines that the vehicle 100 has been damaged if the damage detection data collected by the tilt sensor 118 indicates that the vehicle 100 has been tilted or lifted and/or if the damage detection data collected by the tilt sensor 118 indicates that the vehicle 100 has shifted suddenly (e.g., due to a collision). In response to the remote processor 218 not detecting damage to the vehicle 100, the method 500 returns to block 518. Further, in some examples, the method 500 returns to block 516 to determine whether the monitoring duration has been reached upon the remote processor 218 not detecting damage to the vehicle 100. Otherwise, in response to the remote processor 218 detecting that damage has been caused to the vehicle 100, the method 500 proceeds to block 520.

At block 520, the remote processor 218 determines the current charge level of the battery 104. In some examples, the remote processor 218 determines the current charge level of the battery 104 based upon the charge level of the battery 104 prior to the vehicle 100 being in the key-off state, the time duration of the vehicle 100 being in the key-off state, and/or to what extent the battery 104 battery has been recharged via a charging source while in the key-off state. In other examples, the remote processor 218 activates the battery control module 202 (e.g., via the gateway module 220), the battery sensor 121 detects the charge level of the battery 104, and the remote processor 218 receives the charge level of the battery 104 via the communication module 108.

At block 522, the remote processor 218 determines a data collection duration which damage identification data is collected to identify a type, a vehicle location, a severity, and/or a source (e.g., a person, a vehicle, etc.) of the damage caused to the vehicle 100. For example, the remote processor 218 determines the data collection duration based upon the current charge level of the battery 104 to prevent the battery 104 of the vehicle 100 from draining or becoming discharged as the damage identification data is collected. At block 524, the remote processor 218 prioritizes activation of the sensors 204 and/or the ECUs 206 that enables collection of the damage identification data. For example, the remote processor 218 prioritizes activation of the proximity sensors 114, the cameras 116, the communication module 122, the central timing module 226, the camera module 228, the body control module 230, etc. In some examples, the remote processor 218 prioritizes the sensors 204 and/or the ECUs 206 from those that consume the least amount of charge to those that consume the most amount of charge to collect the damage identification data.

At block 526, the remote processor 218 activates one of the sensors 204 and/or one of the ECUs 206 based on the how the remote processor 218 prioritized the sensors 204 and/or the ECUs 206 at block 524. For example, the remote processor 218 sends an activation signal to the communication module 108 to activate one or more of the cameras 116 to collect the damage identification data responsive to the remote processor 218 detecting at block 518 that damage has been caused to the vehicle 100 and determining that the current charge level is greater than a predetermined charge level. In some such examples, the remote processor 218 sends the activation signal to the communication module 108, the communication module 108 receives the activation signal, the gateway module 220 causes the battery control module 202 to activate upon the communication module 108 receiving the activation signal, and the battery control module 202 subsequently activates the camera module 228 to activate one or more of the cameras 116.

At block 528, the one or more of the sensors 204 and/or the one or more of the ECUs 206 activated at block 526 collect the damage identification data. In some examples, the damage identification data is collected to identify a type, a vehicle location, a severity, and/or a source (e.g., a person, a vehicle, etc.) of the damage caused to the vehicle 100. For example, the cameras 116 collect the damage identification data (e.g., image(s) and/or video) to facilitate identification of the source of the damage caused to the vehicle 100. Thus, the one or more sensors 204 activated at block 510 may collect the damage detection data when the camera module 228 is in sleep mode to conserve the charge level of the battery 104, and the one or more cameras 116 collect the damage identification data when the camera module 228 is in an active mode.

At block 530, the remote processor 218 determines whether the data collection duration has been reached. In response to the remote processor 218 determining that the data collection duration has been reached, the method 500 proceeds to block 534. Otherwise, in response to the remote processor 218 determining that the data collection duration has not been reached, the method 500 proceeds to block 532 at which the remote processor 218 determines whether to activate another one of the sensors 204 and/or the ECUs 206 to collect additional damage identification data. In response to the remote processor 218 determining not to activate another one of the sensors 204 and/or the ECUs 206, the method proceeds to block 534. Otherwise, in response to the remote processor 218 determining to activate another one of the sensors 204 and/or the ECUs 206, the method 500 returns to block 526. In some examples, the activates one or more of the sensors 204 (e.g., the proximity sensors 114) that were activated to collect damage detection data to also collect damage identification data. Further, in some examples, the remote processor 218 activates (e.g., via the activation signal) the clock 234 of the central timing module 226 to detect a time at which the damage is caused to the vehicle 100. Additionally or alternatively, the remote processor 218 activates (e.g., via the activation signal) the communication module 122 (e.g., the dedicated short range communication module) to communicate with nearby vehicle(s) (e.g., via vehicle-to-vehicle communication) and/or nearby infrastructure (e.g., via vehicle-to-infrastructure communication) to collect damage identification data from the nearby vehicle(s) and/or the nearby infrastructure. For example, the communication module 122 obtains damage identification data via vehicle-to-vehicle communication that is collected from a camera of a vehicle that is located near the vehicle 100 when the damage occurs.

At block 534, the vehicle 100 sends and/or stores the vehicle identification data to be accessed at a later time to determine a type, a vehicle location, a severity, and/or a source (e.g., a person, a vehicle, etc.) of the damage caused to the vehicle 100. For example, the vehicle 100 stores the vehicle identification data in the database 214 of the battery control module 202 of the vehicle 100 and/or sends the vehicle identification data to the remote processor 218 via the communication module 108. Further, at block 536 the communication module 112 of the vehicle 100 notifies (e.g., via a text message) a user (e.g., the driver) of the vehicle 100 upon detection of damage caused to the vehicle 100.

Figure 6:
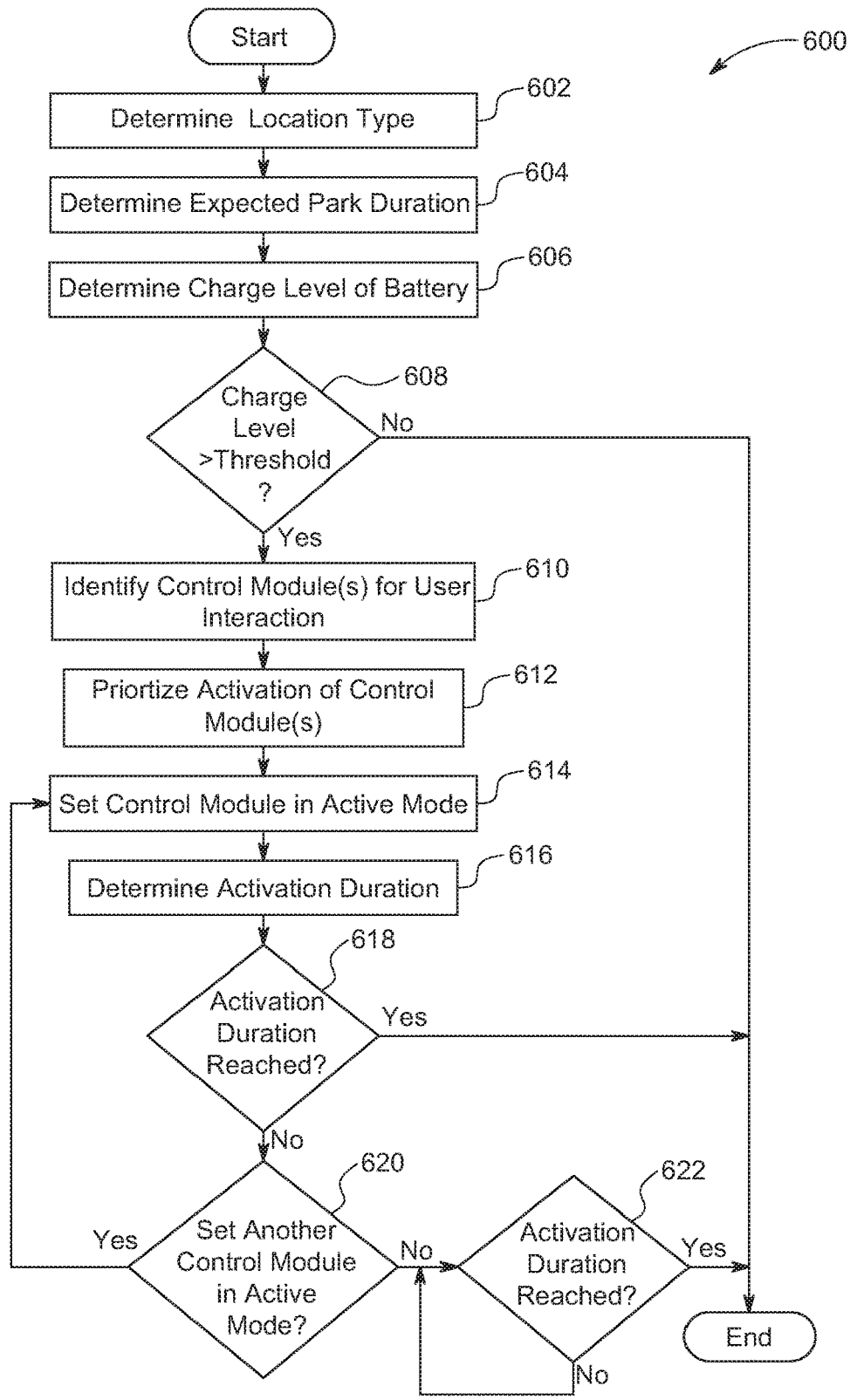
FIG. 6 is a flowchart for setting the control module(s) of FIG. 3 in the active state based upon an expected duration during which the vehicle of FIG. 1 is parked.

FIG. 6 is a flowchart of an example method 600 to implement block 310 of FIG. 3 to activate one or more control modules of a vehicle based upon a parking location and an expected parking duration. The flowchart of FIG. 6 is representative of machine readable instructions that are stored in memory (such as the memory 212 of FIG. 2) and include one or more programs which, when executed by a processor (such as the processor 210 of FIG. 2), cause the example vehicle 100 of FIG. 1 to activate one or more of the example ECUs 206 of FIG. 2 based upon a parking location and an expected parking duration. While the example program is described with reference to the flowchart illustrated in FIG. 6, many other methods for activating control modules based upon a parking location and an expected parking duration may alternatively be used. For example, the order of execution of the blocks may be rearranged, changed, eliminated, and/or combined to perform the method 600. Further, because the method 600 is disclosed in connection with the components of FIGS. 1-2, some functions of those components will not be described in detail below.

Initially, at block 602, the remote processor 218 determines a type of location at which the vehicle 100 is in the key-off state. For example, the remote processor 218 may identify that the vehicle 100 is at a gas-station, a post office, a parallel parking sport along a side of a street, etc. At block 604, the remote processor determines an expected parking duration based on the location type at which the vehicle 100 is parked. That is, the remote processor 218 identifies the parking duration for the vehicle 100 at the location based on historical data. In some examples, the remote processor 218 utilizes cloud-based learning to determine the parking duration for a geo-fenced area that includes the location of the vehicle 100 based upon previous parking data provided by the vehicle 100 and/or other vehicles. For example, if the remote processor 218 determines that the vehicle is parked at a fueling station, the remote processor 218 identifies the parking duration associated with fueling station. If the remote processor 218 determines that the vehicle is parked at a store (e.g., a post office), the remote processor 218 identifies the parking duration associated with store. If the remote processor 218 determines that the vehicle is parallel parked along a street, the remote processor 218 identifies the parking duration associated with vehicles parked on that street.

At block 606, the remote processor 218 determines a current charge level of the battery 104 of the vehicle 100. For example, to determine the current charge level of the vehicle while the battery control module 202 is in sleep mode, the remote processor 218 calculates the current charge level of the battery 104 based upon the charge level of the battery 104 prior to the vehicle 100 being in the key-off state and a time duration of the vehicle 100 being in the key-off state. In some examples, the remote processor 218 identifies a discharge rate at which the charge level of the battery 104 reduces based on a make, a model, a body type, an options package, and/or any other characteristic of the vehicle 100. Further, in some examples, the remote processor 218 determines the current charge level of the battery 104 based upon whether and to what extent the battery 104 battery has been recharged via solar panel 132, the EV receptacle 134, and/or any other charging source. For example, the solar panel 132 may reduce and/or negate the discharge rate of the battery 104 over time.

At block 608, the remote processor 218 determines whether the current charge level of the battery 104 is greater than a predetermined charge threshold. For example, the predetermined charge threshold corresponds to a minimum charge level that enables one or more of the ECUs 206 (e.g., control modules) to be activated for a predetermined amount of time (e.g., a minimum activation duration) without causing the battery 104 of the vehicle 100 to become drained or discharged. In response to the remote processor 218 determining that the current charge level of the battery 104 is not greater than the predetermined charge threshold, the method 600 ends. In some examples, the battery control module 202 (e.g., via the communication module 108) and/or the remote processor 218 notifies the driver via a mobile device that the battery 104 has a low charge level. Additionally or alternatively, the battery control module 202 may cause the vehicle 100 to start autonomously for a period of time when the vehicle 100 is outdoors (e.g., determined via the GPS receiver 110) to enable the battery 104 to recharge over time. In such examples, the battery control module 202 may not cause the vehicle 100 to start autonomously when the vehicle is indoors to avoid carbon monoxide buildup within the indoor facilities. Otherwise, in response to the remote processor 218 determining that the current charge level of the battery 104 is greater than the predetermined charge threshold, the method 600 proceeds to block 610.

At block 610, the remote processor 218 identifies one or more of the ECUs 206 that facilitate user interaction. For example, the remote processor 218 identifies the infotainment head unit 124 that presents media and/or other information to a user of the vehicle 100, the telematic control unit 222 that enables the user to identify its location, the central timing module 226 that enables the user to identify the time, the camera module 228 that enables one or more of the cameras 116 to collect image(s) and/or video presented to the user, the communication module 122 that facilitates communication between the vehicle 100 and a mobile device of the user, the body control module 230 that enables the user to control windows, seat locations, and/or other settings of the vehicle 100, the HVAC module 232 that enables the user to control settings of the HVAC unit 130, etc.

At block 612, the remote processor 218 prioritizes activation of the ECUs 206 identified at block 610. For example, the remote processor 218 determines which of the ECUs 206 are to be activated, and in which order, while the vehicle 100 remains in the key-off state to prevent activation of one or more of the ECUs 206 from causing the battery 104 to become discharged. The remote processor 218 prioritizes the ECUs 206 based upon the charge level of the battery 104, the location of the vehicle 100, and/or the corresponding parking duration. For example, if the vehicle 100 is parked at a fueling station, the remote processor 218 prioritizes the infotainment head unit 124 to enable media (e.g., music) to continue to be presented to the user while the vehicle 100 is being refilled at the fueling station. If the vehicle 100 is parked at a post office, the remote processor 218 may prioritizes the HVAC module 232 to enable the HVAC unit 130 to maintain a comfortable cabin environment for the user to return to. If the vehicle 100 is parallel parked along the side of a street, the remote processor 218 may prioritize the camera module 228 and the communication module 122 to enable one or more of the cameras 116 to obtain image(s) and/or video of the vehicle 100 and the communication module 122 to send the image(s) and/or video to a mobile device of the user to enable the user to monitor the vehicle 100. In other examples in which the vehicle 100 is parallel parked along the side of a street, the remote processor 218 may prioritize the central timing module 226 and the communication module 122 to facilitate warning the user, via a mobile device, when a parking meter is to be paid.

At block 614, the remote processor 218 sends an activation signal to the communication module 108 of the vehicle 100 to activate one of the ECUs 206 of the vehicle 100. That is, the remote processor 218 sends the activation signal to the vehicle 100 responsive to determining that the charge level of the battery 104 is greater than a predetermined threshold associated with the location at which the vehicle 100 is parked. Additionally or alternatively, the remote processor 218 sends the activation signal to the vehicle 100 responsive to determining that the charge level of the battery 104 is greater than a predetermined threshold associated with the parking duration identified at block 604.

For example, if the vehicle 100 is parked at a fueling station, the remote processor 218 sends the activation signal to the communication module 108 to activate the infotainment head unit 124 such that the display 126 and/or the speakers 128 present media to the user of the vehicle 100 during refueling of the vehicle 100. For example, after the vehicle 10 has transitioned from an on-state to the key-off state, the remote processor 218 sends the activation signal, the communication module 108 receives the activation signal, the gateway module 220 causes the battery control module 202 to activate upon the communication module 108 receiving the activation signal, and the battery control module 202 subsequently activates the infotainment head unit 124.

In other examples, if the vehicle 100 is parked at a post office, the remote processor 218 sends the activation signal to activate the HVAC module 232 to enable the HVAC unit 130 to maintain a comfortable cabin environment of the vehicle 100. If the vehicle 100 is parallel parked along the side of a street, the remote processor 218 sends the activation signal to activate the camera module 228 and the communication module 122 (e.g., a dedicated short range communication module) to enable the user to monitor the vehicle 100 via image(s) and/or video obtained by one or more of the cameras 116. In other examples in which the vehicle 100 is parallel parked along the side of a street, the remote processor 218 sends the activation signal to activate the central timing module 226 and the communication module 122 to facilitate warning the user that a parking meter is about to expire.

At block 616, the remote processor 218 and/or the battery control module 202 determines an activation duration for the activated one of the ECUs 206 based upon the current charge level and/or which of the ECUs 206 are activated. For example, the activation duration is determined to prevent the battery 104 of the vehicle 100 from being discharged due to activation of the infotainment head unit 124 and/or any other of the ECUs while the vehicle 100 remains in the key-off state.

At block 618, the remote processor 218 determines whether the activation duration has been reached. In response to the remote processor 218 determining that the activation duration has been reached, the activated one(s) of the ECUs 206 return to a sleep mode and the method 600 ends. Otherwise, in response to the remote processor 218 determining that the activation duration has not been reached, the method 600 proceeds to block 620 at which the remote processor 218 determines whether to set another one of the ECUs 206 in an active mode. In response to the remote processor 218 determining to set another one of the ECUs 206 in an active mode, the method 600 returns to block 614. For example, if the vehicle 100 is at a fueling station and the infotainment head unit 124 is activated, the remote processor 218 also may activate the HVAC module 232 if the charge level of the battery 104 is great enough. Otherwise, in response to the remote processor 218 determining not to set another one of the ECUs 206 in an active mode, the method 600 proceeds to block 622 at which the remote processor 218 determines whether the activation duration has been reached. In response to the remote processor 218 determining that the activation duration has been reached, the activated one(s) of the ECUs 206 return to a sleep mode and the method 600 ends. Otherwise, in response to the remote processor 218 determining that the activation duration has not been reached, the method 600 returns to block 622.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system comprising:
a vehicle at a location in a key-off state including:
a battery;
a communication module; and
an infotainment unit to activate and present media responsive to the communication module receiving an activation signal; and
a remote processor to:
determine a charge level of the battery;
identify a parking duration for the location; and
send the activation signal responsive to the charge level being greater than a threshold associated with the parking duration.

2. The system of claim 1, wherein the remote processor sends the activation signal to activate the infotainment unit after the vehicle has transitioned from an on-state to the key-off state.

3. The system of claim 1, wherein at least one of a display and a speaker of the infotainment unit presents the media upon the infotainment unit being activated when the location of the vehicle is at a fueling station.

4. The system of claim 1, further including an HVAC unit that activates responsive to the communication module receiving the activation signal when the location of the vehicle is a post office.

5. The system of claim 1, further including a camera module that activates responsive to the communication module receiving the activation signal when the location of the vehicle is a parallel parking spot on a street.

6. The system of claim 1, further including a dedicated short range communication module for communication with a mobile device, the dedicated short range communication module activates when the vehicle is in the key-off state responsive to the communication module receiving the activation signal.

7. The system of claim 1, wherein the vehicle includes a GPS receiver to determine the location.

8. The system of claim 1, wherein the communication module is to send the location and the charge level to the remote processor via the communication module prior to the vehicle being in the key-off state.

9. The system of claim 1, wherein the vehicle includes a battery sensor to detect the charge level of the battery.

10. The vehicle of claim 1, wherein the vehicle includes a battery control module that activates the infotainment unit upon the communication module receiving the activation signal from the remote processor.

11. The system of claim 1, wherein the remote processor determines a current charge level of a battery of the vehicle based upon the charge level prior to the vehicle being in the key-off state and a time duration of the vehicle being in the key-off state.

12. The system of claim 11, wherein the remote processor activates the infotainment unit in response to determining that the current charge level is greater than a predetermined charge threshold.

13. The system of claim 12, wherein, to deter the battery from being discharged, the remote processor determines an activation duration during which the infotainment unit is activated when the vehicle is in the key-off state.

14. The system of claim 13, wherein the infotainment unit returns to a sleep mode upon the activation duration ending and the vehicle remaining in the key-off state.

15. A method comprising:
determining, via a remote server, a charge level of a battery of a vehicle parked at a location in a key-off state;
identifying, via the remote server, a parking duration of the vehicle at the location;
activating, via the remote server, an infotainment unit of the vehicle when the charge level is greater than a threshold associated with the parking duration; and
presenting media via the infotainment unit.

16. The method of claim 15, wherein the infotainment unit presents the media via at least one a display and a speaker of the infotainment unit upon the infotainment unit being activated when the location of the vehicle is a fueling station.

17. The method of claim 15, further including sending, via a communication module of the vehicle, the location and the charge level to the remote server prior to the vehicle being in the key-off state.

18. The method of claim 15, further including activating an HVAC unit responsive to determining the location of the vehicle is a post office.

19. The method of claim 15, further including activating a camera module responsive to determining the location of the vehicle is a parallel parking spot on a street.

20. A tangible computer readable medium including instructions which, when executed, cause a remote server to:
determine a charge level of a battery of a vehicle parked at a location in a key-off state;
identify a parking duration of the vehicle at the location;
activate an infotainment unit of the vehicle responsive to the charge level being greater than a threshold associated with the parking duration; and
present media via the infotainment unit.

* * * * *